United States Patent [19]

Hoppstadter

[11] Patent Number: 4,853,684

[45] Date of Patent: Aug. 1, 1989

[54] REMOTE CONTROL SYSTEM FOR VENDING MACHINES

[76] Inventor: Harold F. Hoppstadter, 1432 56 St. South, Gulfport, Fla. 33737

[21] Appl. No.: 144,374

[22] Filed: Jan. 15, 1988

Related U.S. Application Data

[63] Continuation of Ser. No. 818,234, Jan. 13, 1986, abandoned.

[51] Int. Cl.⁴ ........................... G06F 7/04; G06F 7/08

[52] U.S. Cl. .......................... 340/825.35; 340/825.69; 340/825.06; 340/825.72; 364/479; 235/381

[58] Field of Search ........... 340/825.35, 825.3, 825.06, 340/825.69, 825.72; 364/479, 478; 235/385, 381

[56] References Cited

U.S. PATENT DOCUMENTS

| | | | |
|---|---|---|---|
| 2,663,398 | 12/1953 | Skillman | 364/479 |
| 3,786,421 | 1/1974 | Wostl et al. | 340/825.35 |
| 4,120,452 | 10/1978 | Kimura et al. | 364/479 |
| 4,199,100 | 4/1980 | Wostl et al. | 340/825.35 |
| 4,233,660 | 11/1980 | Fagan | 364/479 |
| 4,354,613 | 10/1982 | Desai et al. | 364/479 |
| 4,369,442 | 1/1983 | Werth et al. | 340/825.35 |
| 4,405,984 | 9/1983 | Siegel et al. | 364/479 |
| 4,412,292 | 10/1983 | Sedam et al. | 364/479 |
| 4,598,379 | 7/1986 | Awane et al. | 364/479 |
| 4,630,042 | 12/1986 | Kawasaki et al. | 340/825.35 |

*Primary Examiner*—Robert L. Griffin
*Assistant Examiner*—Ralph E. Smith

[57] ABSTRACT

A remotely operated control system for vending machines as a replacement for the coin-operated mechanism of such vending machines. The system includes a remote control box disposed any desired position away from the vending machine, a control center and either a connection box or control mechanism within the control center and either connection box or control mechanism assembled in the vending machine in place of the conventional coin mechanism otherwise employed. The system is supplied electrical power from a normal supply source and includes appropriate circuitry which is either wire or frequency operated. In the utilization of the system a purchaser of merchandise to be vended by the vending machine gives the purchase price to a salesperson who in turn actuates a button controlled switch in the control box effective to put the system in operation and places the vending machine in vend condition. The purchaser then goes to the vending machine and either through a lever, push button, or other actuating device receives his purchased product or article. The system at this time returns to stand-by no-vend condition.

6 Claims, 4 Drawing Sheets

REMOTE CONTROL SYSTEM FOR VENDING MACHINES

This is a continuation of pending application Ser. No. 818,234 filed Jan. 13, 1986.

FIELD OF THE INVENTION

This invention relates to article vending machines and more particularly to remote control systems therefor.

STATE OF THE PRIOR ART

Coin operated vending machines for dispensing soft drinks, cigarettes and the like are well known because of the extensive use thereof presently and for many years past. However no one up to the present has devised means to substitute an appropriate remotely operated control system for the coin mechanism and accumulation systems presently used in such vending machines.

SUMMARY OF THE INVENTION

The remote control system for article vending machines covered hereby is for the purpose of eliminating the use of coins in vending machines at the point of purchase of the desired article from the machine. The remote control system replaces the coin mechanism and accumulation systems now used with the customer being obliged to make his desired purchase from a clerk (control person) disposed at a counter or the like remote from the vending machine. Upon paying the clark the required amount for the particular article desired, be it from a cigarette, soft drink or like product vending machine, the clerk depresses credit button or the like on a control box or kit. This action through appropriate control circuitry and operating mechanism located in the vending machine releases control means on the vending machine permitting the customer by engaging a lever or switch at the vending machine to have his article dispensed from the machine. The control circuitry and mechanism can be wired back to the control box or be frequency operated by a frequency transmitter control box and a frequency receiver in the control circuitry.

Through the use of the present system no coins go into the vending machine because of the coins condition (bent, dirty, etc.) or wrong type might otherwise jam the machine and thus put it out of commission until it is repaired. Not only are sales lost during this period of repair but the loss of dollars required for repair.

In view of the fact that there are several manufacturers of the more popular makes of vending machines, different control circuits and vending door release mechanisms are required, following within the basic idea, for replacing the coin mechanisms and accumulator systems of present day machines.

Although the present invention is primarily for use with single price articles to be dispensed. it is readily modified as taught hereby for dual or multiple pricing.

By remotely controlling the vending machine as above stated, there is no requirement to modify the vending machine and coin mechanism when price changes are required relative to the articles being dispensed. Since the control person collects the costs of the article to be dispensed, the control button or buttons as the case may be are operated to dispense the article of a given price. Such, for example, if articles of different cost, say two, are contained in the vending machine, one button can be activated for articles costing $1 (one dollar) and another button for articles costing $1.25 (one dollar and a quarter). The customer having chosen say a dollar article can then activate the appropriate lever or switch effective to procure his desired article as released by the control systems actuation.

An object of the invention is the provision of a remotely operated control system for vending machine to replace already existing coin mechanism employed therein.

Another object of the invention is the provision of a remotely operated control system for vending machines wherein the money for purchase is paid to the vending machine control person located away from the vending machine.

A further object of the invention is the provision of a remotely operated control system effective to control the dispensing of purchased articles without coins to be deposited in the vending machine.

A yet further object of the invention is the provision of a wired or frequency control remotely operated control system for vending machines which eliminates the use of coins which, because of condition or foreign origin, might jam the machine and cause subsequent use delay and expense to repair the machine. Further by the elimination of coins in the machine, damage to the machine which might otherwise occur throuth theft is avoided.

DESCRIPTION OF THE PREFERRED EMBODIMENTS

Figures 1, 2:
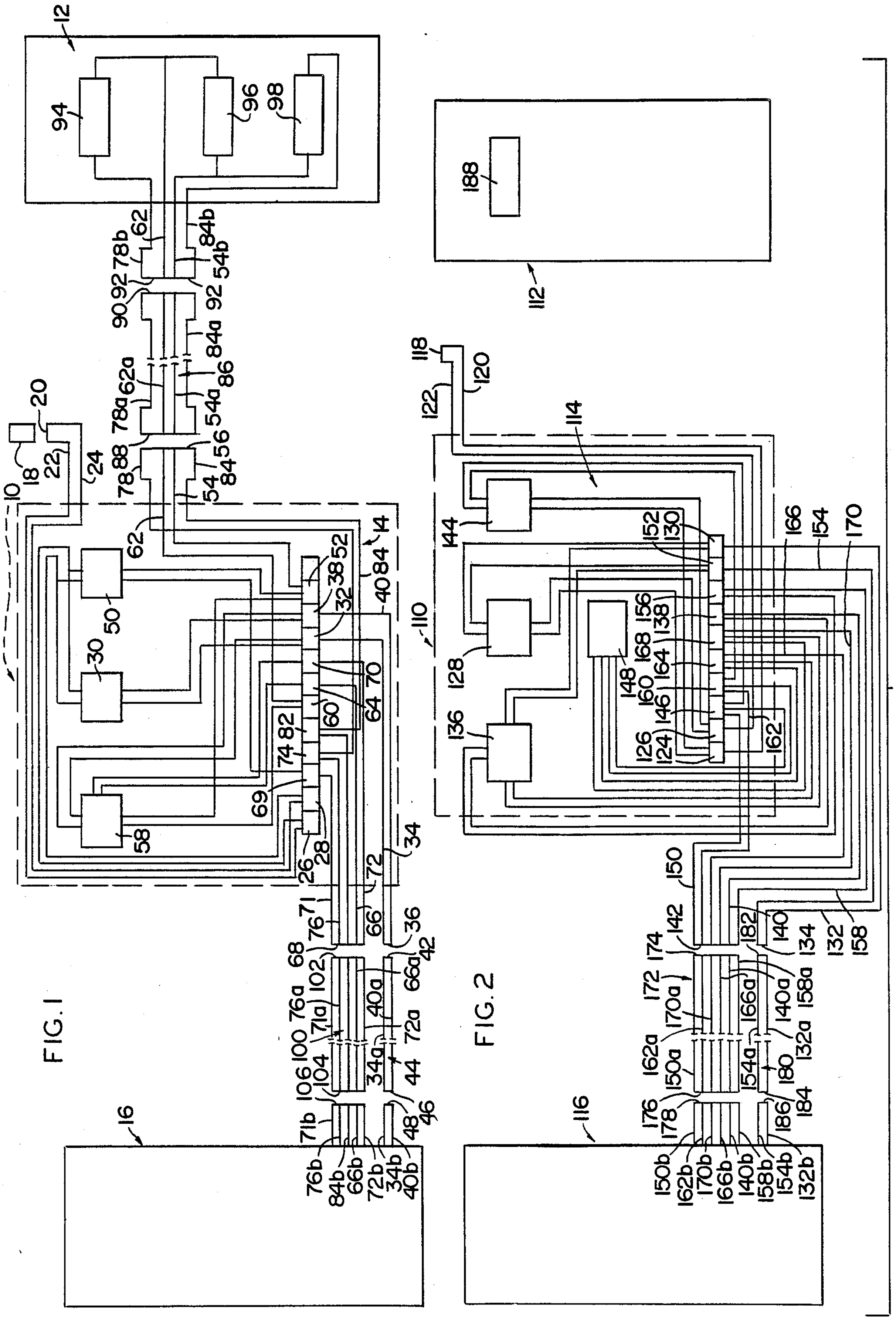
FIG. 1 is a combination block and schematic circuit diagram of a wired master or basic control system.
FIG. 2 is a combination block and schematic circuit diagram of a frequency controlled master or basic control system.

FIG. 1 is a schematic view and block diagram of a wired remote control system 10 for various well known present day vending machines of the type primarily for vending cigarettes, containered soft drinks and the like. The system comprises a control box or kit 12, control center circuitry 14 and control mechanism 16. Control mechanism 16 and control center circuitry 14 are adapted to be arranged in separate box units, not shown, for installation in the vending machine as a replacement for the conventional coin box and accumulator normally provided. The control box 12 is to be located at some suitable and convenient place remote from the vending machine and not available to the customer but for use by a clerk or sales person.

Electrical power from a 120 Volt AC source is supplied to the control center 14 through plug 18 for coupling with socket 20 with the supplied current in conduits 22 and 24 connected with the socket flowing therethrough respectively from conduit 22 to terminal 26 and from conduit 24 to terminal 28. From terminal 26 current flows to a 115 Volt AC transformer 30 and then from transformer 30 to terminal 32 from where it flows through conduit 34 to socket 36. Current from terminal 28 supplied from conduit 24 flows therefrom to transformer 30 and then from there to terminal 38 and then through conduit 40 to socket 36.

Socket 36 is adapted to be coupled with a plug 42 of an electrical harness 44 with plug 46 of the harness adapted to be coupled to a socket 48 which it in turn supplies current to control mechanism 16.

Current from terminal 28 in addition to flowing to transformer 30 flows to a 24 Volt AC 5 to 1 stepdown transformer 50 and then from there to terminal 52. From terminal 52 current is supplied therefrom through conduit 54 terminating at socket 56, and representing the ground side of the control box 12, counter and light to be hereinafter defined. Also from terminal 52 current flows to 24 Volt AC relay 58 and from relay 58 to terminal 60. From terminal 60 conduit 62 carries current to socket 56 and at that point represents the common side of the switch, to be hereinafter defined, located in the control box 12.

From relay 58 current flows to terminal 64 and from there through conduit 66 to socket 68. A conduit connects terminal 26 to stepdown transformer 50 and then from transformer 50 to terminal 69 and conduit 71 connects terminal 69 to socket 68.

From terminal 38 current flows to the other side of relay 58 and then to terminal 70 from where it flows through conduit 72 to socket 68.

Terminal 74 has conduits connected thereto with conduit 76 terminating at socket 41 and conduit 78 terminating at socket 56. From terminal 80 conduit 82 extends therefrom to socket 41 and conduit 84 to socket 56.

Electrical harness 86 includes four conduits **54*a*, 62*a*, 78*a* and 84*a* corresponding to conduits 54, 63, 78 and 84 of control center 14, and terminates at one end in plug 88 adapted to be coupled with socket 56 and at its other end in plug 90 adapted to be coupled with socket 92 of wiring conduits 54*b*, 62*b*, 78*b* and 84*b* of control box 12. The control box includes operation button or switch 94, counter 96 and light 98 appropriately connected to the conduits 54*b*, 62*b*, 78*b* and 84*b***.

Electrical harness 100 comprises five conduits **71*a*, 66*a*, 72*a*, 76*a* and 84*a* corresponding to conduits 71, 72, 76 and 84 of control center 14 and terminates at one end in plug 102 adapted to be coupled to socket 68 and at its other end in a plug 104 adapted to be coupled with a socket 106 of conduits 71, 66*b*, 72*b*, 76*b* and 84*b* which supply appropriate electrical power for the operation of mechanism of control mechanism 16. Control mechanism 16** of varied forms will be hereinafter described.

FIG. 2 is a schematic view and block diagram of a frequency operated remote control system 110 for like use as system 10. The system comprises a control box frequency operating transmitter 112, control center circuitry 114 and control mechanism 116. Control center 114 and control mechanism are to be arranged in conventionally well known vending machines in place of the coin box and accumulation system therefor whereas the transmitter box is disposed a distance away from the vending machine for sales person operation.

Electrical power from a normal 120 Volt AC source is adapted to be supplied to control center 114 through appropriate coupling with socket 118 having conduits 120 and 122 connected thereto. Conduit 120 is connected at its opposite end from the power source with terminal 124 and conduit 122 with terminal 126. From terminal 124 current flows to 115 Volt AC, 1 to 1 transformer 128 and then to terminal 130. From terminal 130 conduit 132 extends to outlet socket 134. Current also flows from terminal 130 to 24 VAC relay 136 and from there through conduit terminating in terminal 138, with conduit 140 extending therefrom to outlet socket 142.

From 24 Volt AC, 1 to 5 step down transformer 144 a conduit connects with terminal 146 and from terminal 146 to frequency control receiver 148. Also from terminal 146, conduit 150 extends to socket 142.

From terminal 126 a conduit leads to transformer 128 and from there a conduit goes to terminal 152. From terminal 152, conduit 154 terminates in socket 134. A conduit also extends from terminal 152 to relay 136, and from there a conduit goes to terminal 156. Conduit 158 extends from terminal 156 to socket 142.

From terminal 126 a conduit goes to transformer 144 and from there a conduit connects to terminal 160. Another conduit goes from terminal 160 to receiver 148. Conduit 162 extends from terminal 160 to socket 142.

A conduit extends from receiver 148 to terminal 164 and from terminal 164 to relay 136. A conduit 166 goes from terminal 164 to socket 142. Another conduit extends from terminal 164 to relay 136. Terminal 168 also has a conduit extending therefrom to relay 136 and a conduit connected to receiver 148. Conduit 170 from terminal 168 terminates in socket 142.

Electrical harness 172 includes conduits **140*a*, 150*a*, 158*a*, 162*a*, 166*a* and 170*a* terminating at one end, in plug 174, adapted to be coupled to socket 142, and at their other end in plug 176, adapted to be coupled to socket 178. Socket 178 includes conduits 140*b*, 150*b*, 158*b*, 162*b*, 166*b* and 170*b* which at their opposite end from socket 178 connect with mechanism 116**.

Electrical harness 180 includes conduits **132*a* and 154*a* terminating at one end, in a plug 182, adapted to be coupled to socket 134, and at their opposite end in plug 184 adapted to be coupled to a socket 186 including conduits 132*a* and 154*b* which at their opposite end connect with mechanism 116**.

Frequency control box 112 is a transmitter, including a button 188, which is to be actuated for operation of control center 110 and mechanism 116.

Figure 3:
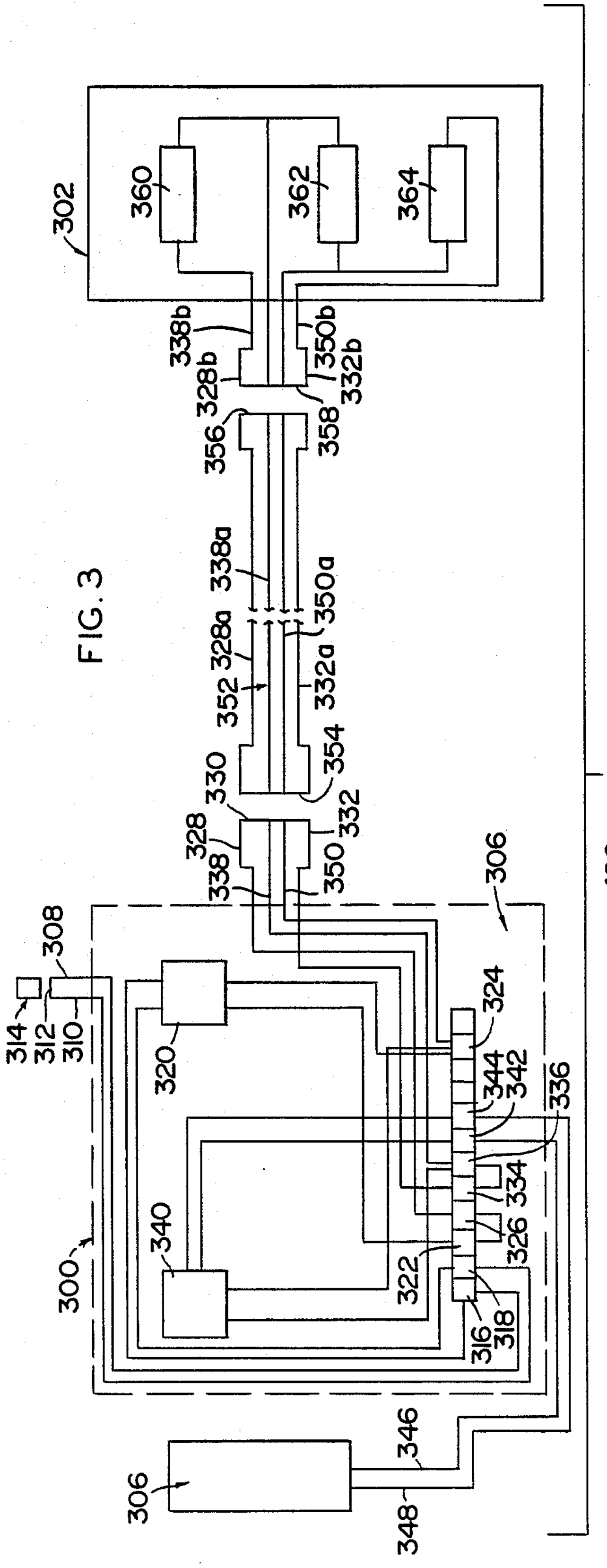
FIG. 3 is a combination block and schematic circuit diagram of another wired control system.

FIG. 3 is of a wired remote control system 300 and differs from system 10, particularly as relates to the type of vending machine with which it is to be associated, and includes a control box 302, a control center 304 and a connector box 306.

Power is supplied to system 300 from a conventional 120 Volt AC supply to input conduits 308 and 310 arranged in a socket 312 adapted to be coupled from power supply plug 314. Conduit 308 goes to terminal 316 while conduit 310 goes to terminal 318. A conduit then goes from terminal 316 to one side of a 24 Volt AC 5 to 1 step down transformer 320 and another conduit goes to the other side of transformer 320. Other conduits then lead from transformer 320 and go respectively to terminals 322 and 324. Terminal 322 is connected to terminal 326 by a jumper conduit and then from terminal 326 by a conduit 328 terminating in socket 330.

A conduit 332 connects terminal 334 with socket 330. A jumper conduit connects terminal 332 with terminal 336 and then conduit 338 extends therefrom to socket 330. A conduit also extends from terminal 336 to a 24 Volt AC relay 340. Conduits extend from terminals 342 and 344 to relay 340 and other conduits 346 and 348 extend respectively from terminals 342 and 344 and terminate at connector box 306. Conduits also connect respectively terminals 336 and 324 with the other leg of relay 340 opposite from conduits extending from terminals 342 and 344. A conduit 350 extends from terminal 324 to socket 330.

An electrical harness 352 is identical to harness 86 of FIG. 1 and includes conduits **328*a*, 332*a*, 338*a*, and 350*a* terminating at one end in a plug 354 adapted to be coupled with socket 330 and at its other end in a plug 356 adapted to be coupled to a socket 358. Conduits 328*b*, 332*b*, 338*b* and 350*b* are associated with socket 358 at one end and with control box 302 at their other end. Control box 302 includes a button switch 360, a counter 362 and a light 364 having appropriate interconnection with conduits of socket 358**.

Figure 4:
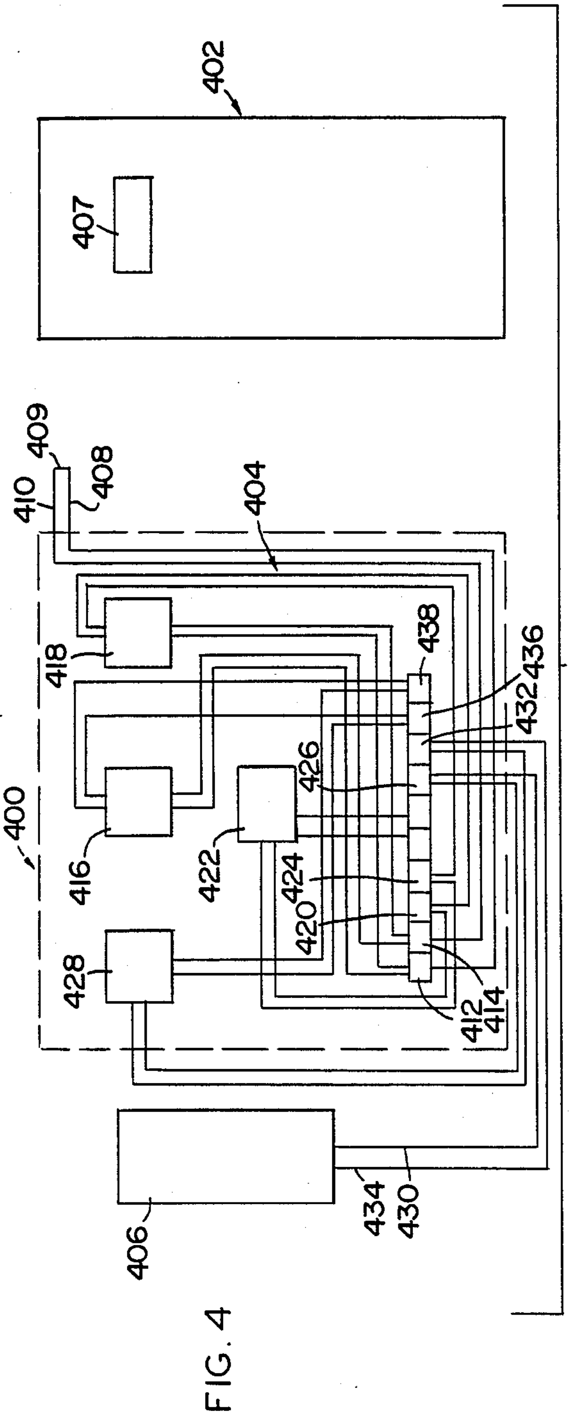
FIG. 4 is a combination block and schematic circuit diagram of another frequency controlled control system.

FIG. 4 is a frequency operated remote control system 400, which is similar to the system 300 but differing in being frequency remote operated instead of wire remote operated. System 400 includes a control box 402, a control center 404 and a connector box 406. A button switch 407 is included in box 402.

Power from a 120 Volt AC line is adapted to be supplied to control center 404 through plug 409 having conduits 408 and 410 connected thereto. Conduit 408 extends from plug 406 to terminal 412 and conduit 408 to terminal 414. From terminal 412 a conduit extends to a 24 Volt AC, 5 to 1, stepdown transformer 416 and another conduit extends to a 115 Volt AC, 1 to 1 transformer 418. Conduits also extend respectively from terminal 414 to transformers 416 and 418. A conduit connects terminal 420 with a frequency actuated receiver 422 and another conduit extends from terminal 420 to transformer 418. A conduit connects terminal 424 with the other side of receiver 422 from its connection with terminal 420. A conduit connects terminal 426 with 24 Volt AC relay 428 and a conduit 430 connects terminal 426 to connector 404. Terminal 432 is also connected to connector 404 by a conduit 434 and also has a conduit connecting it to relay 428. Conduits connect terminal 436 with the relay 428 and to the twenty-four volt side of the transformer 416. Terminal 438 has a conduit connecting it with the relay 428 and a conduit connecting it with transformer 416.

Aside from the wired and frequency operated difference between systems 300 and 400 it is to be noted that control center 404 includes a 115 Volt AC transformer whereas control center 304 dispenses with such a 115 Volt AC transformer. This disclosure is noted so as to point out that while the use of a 115 Volt AC transformer is preferred each of the systems covered herein can operate without such a transformer.

Mechanism 16 and 116 are representative of separate and distinct mechanisms shown by FIG. 5 through 9. Mechanism of FIG. 5 through 9 while operative from basic control centers 10 and 306 are provided each for use with a vending machine of a particular manufacturer. As such while the end function to allow vending of a particular machine is its purpose, separate and different structures are required to accomplish their ultimate purpose.

Figure 5:
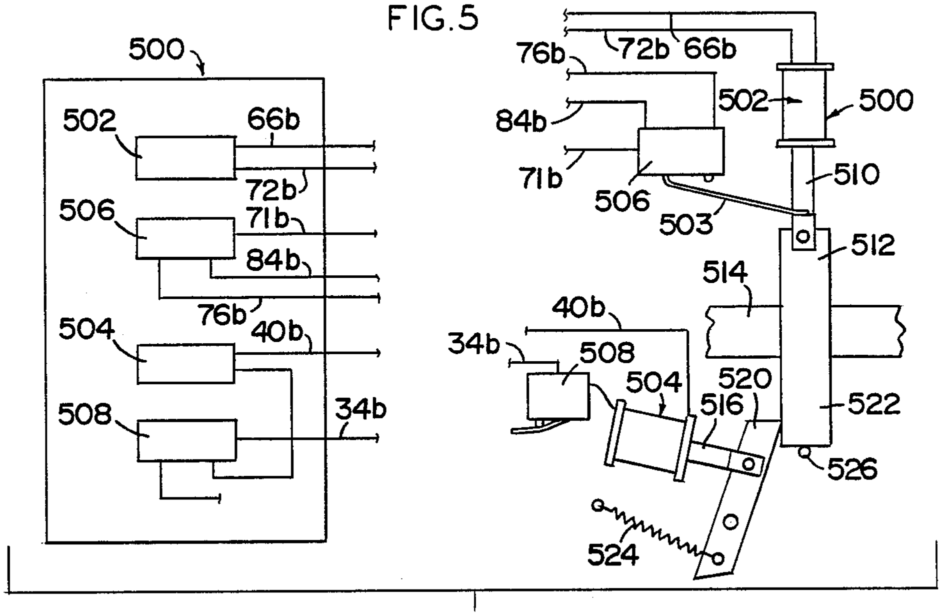
FIG. 5 is a control mechanism and the schematic circuit diagram therefor.

Mechanism 500 as shown by FIG. 5 includes solenoids 502 and 504 and dual position operation switches 506 and 508. Core 510 of the solenoid 502 is connected to a movable bar 512 for movement therewith in guides 514. Core 516 of solenoid 504 is connected to a pivotal lever 518 for controlled movement thereof. One end of lever 518 engages the side of bar 512 in one position and in its other position has end 520 thereof adapted to engage end 522 of bar 512. A spring 524 acts to move lever 518 to end engaging relation thereof with bar 522 effective to hold same in an up position away from stop 526. Spring blade 502 of switch 506 is engaged by the open end of core 510 of solenoid 502 for the operation thereof.

Figure 6:
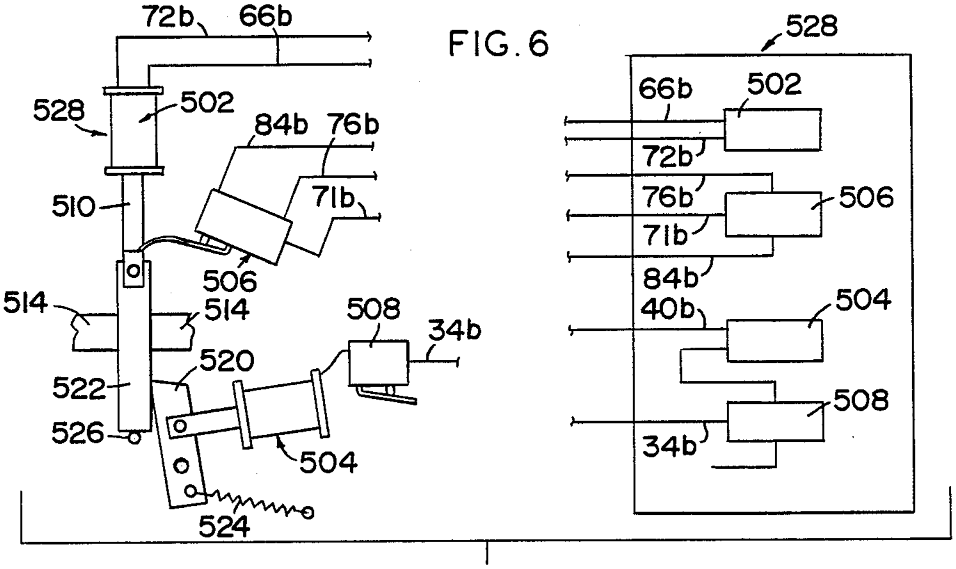
FIG. 6 is another control mechanism and the schematic circuit diagram therefor.

Mechanism 528 of FIG. 6 differs from mechanism 500 only as to the reverse conduit connection to switch 506, that is conduit **76*b* and 84*b* are reversed as to the normally open and normally closed position of switch 506. Switch 508 in both instances of FIG. 5 and 6** is a part of the machine in which these mechanisms are employed.

Figure 7:
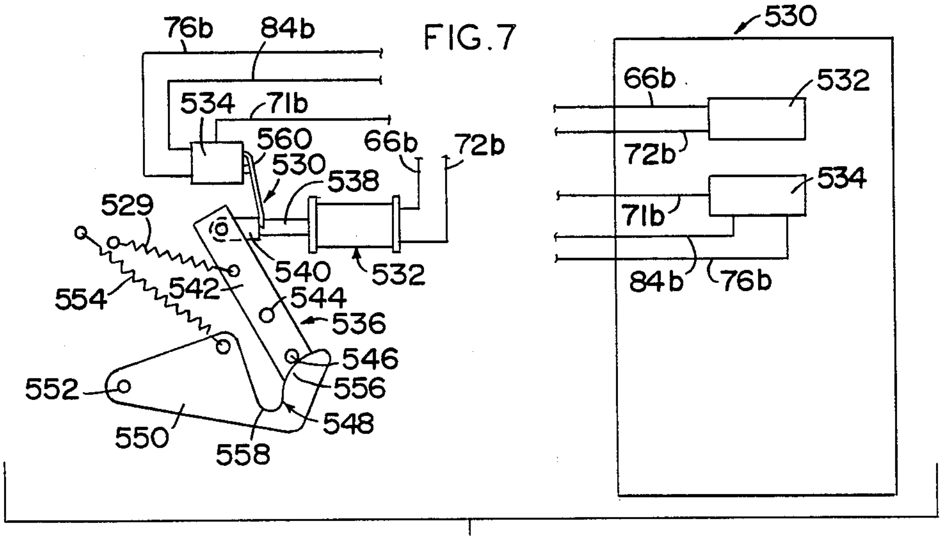
FIG. 7 is another control mechanism and the schematic circuit diagram therefor.
Figure 7A:
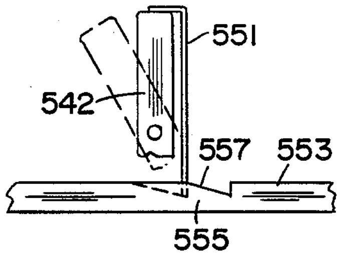
FIG. 7A is a fragmenting view of a portion of FIG. 7 as arranged with a portion of a vending machine.

Mechanism 530 disclosed by FIG. 7 includes a solenoid 532, a dual position switch 534 and a pivotal lever arrangement 536. Core 538 of solenoid 532 is connected at one end by a bar 540 to lever 542 pivotal about fulcrum pin 544. A pin arranged on end 546 of lever 542 is in engagement with a cam surface 548 of pivotal cam member 550. Cam member 550 pivots about fulcrum 552 and is moved in one direction by spring 554 attached thereto. A spring 529 serves to hold lever 542 with pin 546 in engagement with the rise position 556 of cam surface 548. Cam surface 548 also includes a dwell or bottom portion 558. Spring blade 560 of switch 534 is engaged by the open end of core 538 for the operation thereof. With lever 542 in a vertical position, it engages the underside of a locking element 551 with the bottom end thereof riding on the top side 553 of a vending machine slide bar 555 having an angled slot 557 arranged on its top side 553.

Figure 8:
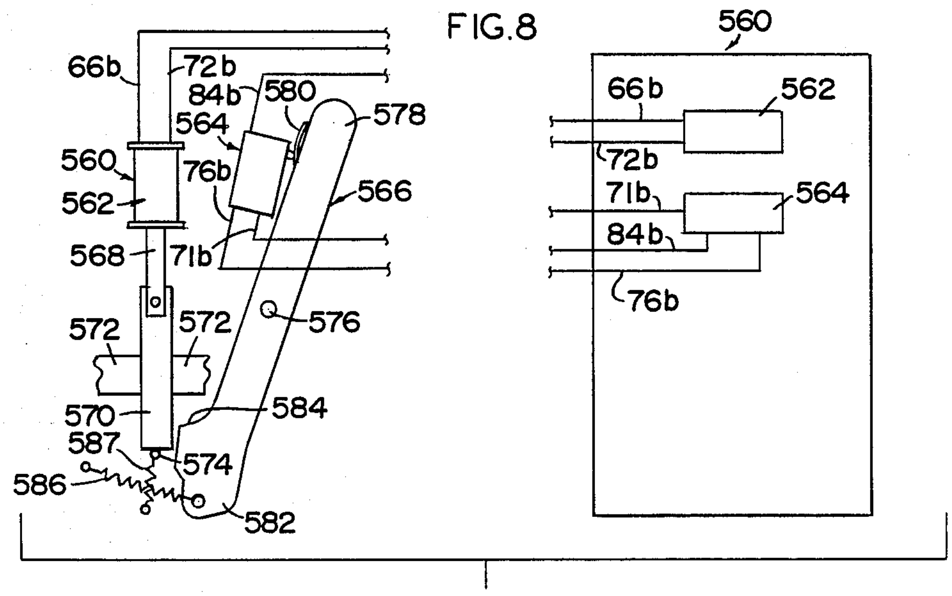
FIG. 8 is another control mechanism and the schematic circuit diagram therefor.

Mechanism 560 shown by FIG. 8 includes a solenoid 562, a dual position switch 564 and a lever 566. Core 568 of solenoid 562 has a bar 570 connected at one end thereof, with the bar slidable in guides 572 and adapted in its outward moved position against a stop pin 574. Lever 566 has a fulcrum 576 with one end 578 of the lever in operative engagement against spring blade 580 of switch 564. The opposite end 582 of lever bears against one side of bar 570 and has a cam portion 584 thereof engagable with the extreme end of bar 570 upon the energization of solenoid and upward movement of core 568 and bar 570 therewith. A spring 586 is effective to pivot the lever to the aforesaid engaged position. A tension spring 587 is attached to the open end of bar effective to move the core and bar downward.

Figure 9:
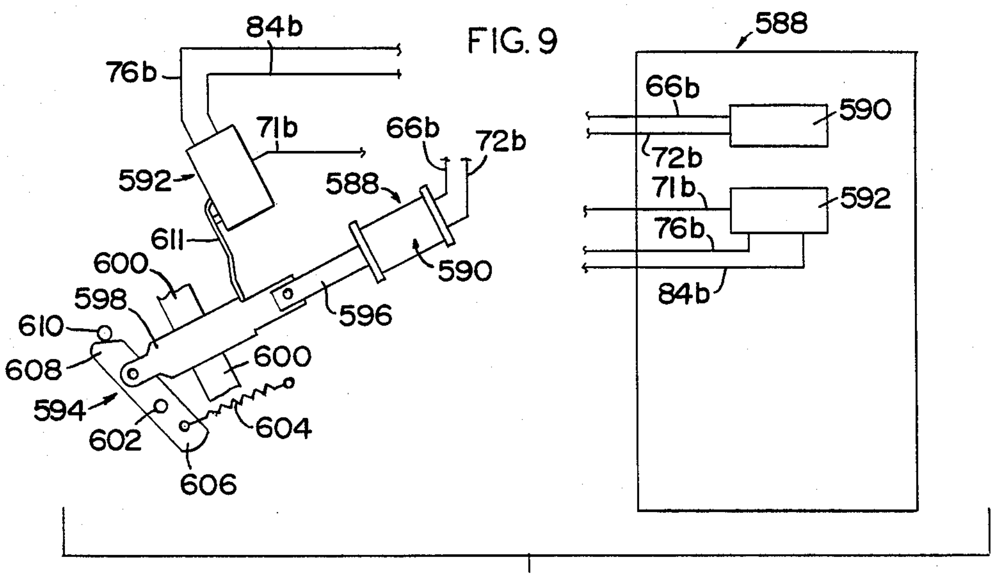
FIG. 9 is another control mechanism and the schematic circuit diagram therefor.

FIG. 9 is of a mechanism 588 including a solenoid 590, a dual position switch 592 and a lever 594. Core 596 of the solenoid has its open end connected to a bar 598 slidable in guides 600, and the bar in turn pivotally connected for movement with lever 594. Lever 594 has a fulcrum 602. A spring 604 is connected to one end 606 of lever 594 whereas the oppostie end 608 of the lever is arranged to engage a part 610 of the vending machine in which this mechanism is installed. A spring blade 611 of switch is actuated to one position by core 596.

Whereas each of the systems disclosed is for use with vending machines where solely a single price item is to be vended it is only necessary to employ additional button operated switches or multiple press button operated switches, together with appropriate other control circuitry and other operative solenoid elements. As such for example one button switch would be operative for the vending of an article of one price and each other button operative for the vending of other priced articles. At the control box the sales person or operator by noting the price of the article to be vended need only press such button when the customer makes a particular currency purchase.

Although credit lights 98 and 364 and counters 96 and 362 are arranged in the control boxes 12 and 302 respectively of systems 10 and 300, the frequency operated arrangement of system 200 and 400 are arranged to have appropriate electrical power fed circuitry included in mechanism 116 and control box 404 for igniting a credit light in the vending machine and operating an inventory counter in the vending machine.

OPERATION OF THE CONTROL SYSTEMS

With any of the control systems of FIG. 1 through 4 and with the appropriate control mechanism of FIG. 5 through FIG. 9 employed therein for a particular vending machine of known manufacture such as Fawn, Federal, Rowe, National, Smokeshop, etc., a customer upon desiring to make a purchase from such a vending machine presents a salesperson, at a point remote from the vending machine, with the appropriate amount of money for the article to be vended by the machine. With the payment made the salesperson actuates a button operated switch which through the operation of the control center and control mechanism sets the vending machine to permit a vend whereupon the customer making the purchase goes to the vending machine and pulls a bar, presses a button or engages an actuating device which releases the article desired from the vending machine. With the actuation of the bar or button the machine through the operating control of the control mechanism and control center returns to a standby or no vend condition.

With voltage supplied from the power source in the case of wired system 10 it is immediately converted to 24 VAC and 115 VAC by transformers 30 and 50. From transformer 30 and with the actuation of button switch 94 current flows through the switch actuating credit light 96 and counter 98 and return therefrom to relay 58. With actuation of relay 58 current is allowed to pass to transformer 50 and then to the control mechanism 16 for the operation of the solenoid forming a part thereof. Simultaneously with the energization of the solenoid, link and cam mechanism are actuated to engage switches supplied through the 24 volt portion of the circuit monitored by transformer 30 and relay 58.

Frequency operated system 110 differs from system 10 only as to the transmission of control between control box 112 and control center 110 by reason of current flow from transformer 128 to operate receiver 148 and in turn operate relay 136. Actuation of transmitter operated button 188 activates control center 104 through receiver 148. Likewise as system 10 at this point 115 volts passes to the solenoid or solenoids of the mechanism 116 for the operation thereof. Current also flows through the 24 volt portion of control center 104 for supply through the switch or switches employed in mechanism 116.

In viewing the wired 300 and frequency operated 400 systems of FIG. 3 and 4 these systems are comparable to the operation of the systems 10 and 110 but for the fact that the output of the control center is a single power input harness to respectively connector boxes 306 and 404. In these arrangements, upon the actuation of the sales person-operated button switch in control box 302 or 402, current flows to the structural working mechanism of the standard vending machines with which these systems 300 and 400 are combined. In the particular vending machines to which these systems 300 and 400 are applied, that is the substitutions of these systems for the conventional coin mechanisms, it is possible to employ any of the mechanisms as disclosed by FIG. 5 through 8 to accomplish a remote control of the vending machine to which applied.

In viewing mechanism 500 of FIG. 5 current flows from either control center 14 or 114 upon the activation of their respective button switch 98 or 188 to energize solenoid 502 and move core 510 upward. Bar 512 connected to core 510 is also moved vertically upward resulting in spring 524 pivoting lever 520 into a position to effectively hold bar 512 and core 510 in the upward position previously moved by the solenoid. Simultaneously switch 506 is actuated by blade 503 being moved by core 510. With core 510 and bar in the upward position the vending machine to which applied is moved to a vend position.

With a completion of a vend operation solenoid 504 is energized effective to move lever 520 away from a hold position of core 510 and bar 512 allowing them to gravitationally move down to position disclosed by FIG. 5. This is a credit cancelling operation. At this point the vending machine is again placed in a standby condition. With placing the circuit center and control mechanism in operation the credit light is appropriately engaged on and off while simultaneously the counter registers another vend.

FIG. 6 is almost identical to FIG. 5 with the exception of opposite control position of switch 506. Otherwise the mechanism operates the same.

Mechanism 530 as shown by FIG. 7 is shown in a standby no vend operation relative to the vending machine to which is applied. As noted a wire or bar 551 forming a part of the vending machine to which mechanism 530 is applied has a bottom end normally resting on the top of a vending pull bar 555 such that upon movement of bar 555 a short distance and without the wire being restricted to move downward the wire slides into slot 557 of bar 555 and thus restricts further movement of vending bar 555 and prevents an unauthorized vend. At this time lever 542 of mechanism is in the position shown in the larger view of FIG. 5 with pin engaging surface 556 of cam surface 548 and as moved thereto by springs 529 and 554. Upon activation of control center 14 from button switch 94 actuation solenoid 532 is energized effective to move core 538 and bar 540 to the right. With bar 540 pivotally connected to lever 542 it is simultaneously pivoted to a position holding wire in an up position thus allowing a vend operation, that is, a full withdrawal of vending bar without interference from wire 551. With the completion of a vending operation and by reason of dual position operation switch 534 the solenoid is automatically de-energized with the springs 529 and 554 moving lever 542 and cam 550 back to the position shown in the larger portion view of FIG. 5. This is a mechanical cancel operation.

FIG. 8 discloses a mechanism 560 as positioned for a standby no vend position of a machine to which it is applied. Upon energization of coil 560 core 568 and bar 570 are moved upward whereupon end 584 of lever 566 is pivoted by a spring 586 to a position effective to hold the core and bar in an upward position, that is the end of bar 570 has its open end engaged by the end 584 of lever 582. Simultaneously normally closed dual position switch 564 is opened as end 578 is moved away from engagement with blade 580 of switch 564. With the de-energization of solenoid 560 and completion of a vending operation, spring 587 acts to pull the bar and core downward against cam portion 584 of lever 566, at the same time a cancel arm in the machine engages portion 578 of lever 566 and pivots it back to the position of FIG. 5 and once again engages switch 564 back to standby position.

Mechanism 588 has its parts in standby condition wherein part 610 of a pull related member of a vending machine in its normal downward direction of movement is restricted from further vend motion by engagement with end 608 of pivotal lever 594. Upon energization of solenoid 590 core 596 and bar 598 connected thereto are moved to the right as viewed and through pivotal connection of bar 598 to lever 594 pivot it away from part 610 and against the resistance of spring 604. Simultaneously with the actuation of the core and bar switch 592 has spring blade 611 engaged by core 596 effective to move it from normal open to closed position. With the de-energization of solenoid 590 core 596, bar 598 and lever 594 are moved to the left under the influence of spring 604 back to the vending machine standby position as disclosed by FIG. 9. Simultaneously herewith the pin 910 will be reset as a part of the machine operation. When the lever end 608 is disengaged from part 610 as above stated, a vend operation is permissible through the movement of part 610 downward as desired.

While the systems covered hereby are most specifically directed for use with vending machines, it is to be understood the principles taught herein can be adapted for remote control of services which might be purchased, such as, for instance, car washing, laundromats, etc.

It is to be appreciated that which the aforesaid description is specific to the disclosures presented, variations in structure are conceivable within the scope of the description and accordingly, the appended claims are intended to define same.

I claim:

1. A control system for vending machines comprising an operator actuated control box including a frequency operated transmitter and a single motion operator actuated button switch, a credit light, an inventory counter, an electrical power supplied control center including a frequency operated receiver free from wired interconnection with the transmitter, wherein upon actuation of the actuator a signal is transmitted between the transmitter and receiver for operation of the system, an article vend operative control mechanism connected to the control center effective upon actuation of the system to place a vend on the vending machine so that a customer operated article release mechanism associated with the article vend operated mechanism can be actuated by a customer to dispense the desired article, whereupon the system returns to a non-dispense condition, and wherein upon the actuation of the system placing the machine in a vend condition the credit light is turned on indicating the machine is in a vend condition and wherein upon the operation of the article release mechanism the credit light is turned off and the inventory control registers a vend operation.

2. A control system for vending machines comprising an operator actuated control box including a frequency operated transmitter, and a salesperson single motion actuator for placing the transmitter in operation with the control box located remotely from the vending machine, an electrical current supplied control center, including a frequency operated receiver, to be actuated by the transmitter when placed in operation, with the control box and control center free from wired connection with each other, a vend apparatus, a credit light, an article release means and an electrical harness for connection between the vend apparatus and control center, with the control center, electrical connector harness and vend apparatus disposed in the vending machine, said actuator upon the operation thereof effective to actuate the transmitter and cause the transmitter to transmit a signal to the receiver for the operation of the system effective to turn on the credit light, actuate the vend apparatus and place the vending machine in a vend condition so that a selection can be made by a customer who actuates the release means to dispense the desired article, and switch means operable by the release means for returning the system to a non-dispense condition while simultaneously turning off the credit light.

3. A control system according to claim 2 wherein the switch means includes a mechanical—electrical mechanism which is actuated upon flow of current, from the control center through the harness, with the system in an on position effective to provide for a vend operation and upon the dispensing of a purchased article from the vending machine, the mechanical—electrical mechanism is tripped to place the machine in a no vend position and turn off the credit light.

4. A control system for replacement of a coin operated mechanism for a vending machine comprising a control mechanism for operating the vending apparatus of the vending machine, an electrical power supplied control center including a radio frequency operated receiver wired with both the control mechanism and control center and together therewith disposed on the vending machine, a credit light and a control box including a single motion actuator in the form of a button operated switch and a radio frequency operated transmitter to be activated by said actuator for actuation of the receiver in the control center, disposed at a location remote from the control mechanism and control center and free from wired connection therewith, said control mechanism comprising electrical—mechanical means for placing the vending machine in a vend position and turn on the credit light, upon actuation of the actuator and means for actuation by a customer to release the article and permit the dispensing thereof and simultaneously returning the vending machine to a no vend condition and turn off the credit light.

5. A control system according to claim 4 wherein the control mechanism includes at least one switch, one solenoid and lever means, such that when a radio signal is sent from the control box and received by the control center, a voltage is sent to the control mechanism from the control center effective to energize the solenoid and move the lever to vend position, close the switch and turn on the light, and whereupon with the operation of means by the customer to release the article to be dispensed the light will be turned off and the lever will be actuated to return the control mechanism to a no vend position.

6. A vending machine and a control system for the vending operation thereof comprising a credit light on the machine which when lit indicates the machine is in a vend position, a control box including a radio frequency transmitter and a button operated switch for placing the transmitter in operation, a 115 volt current supplied control center including a radio frequency operated receiver, and a control mechanism including means supplied by current from the control center for controlling the dispense and no dispense operation of the vending machine and the on-off operation of the light and means operable manually by a customer purchasing an article to be dispensed by the machine when the control mechanism is in vend condition and the light is on indicating the vend condition of the machine, the transmitter operable when actuated to by the button operated switch to send a radio signal to the receiver so as to place the system in operation and provide for the supply of current for the operation of the control mechanism, and wherein the control center and control mechanism are totally disposed in the machine in electrical interconnection with each other and the control box is located remote from the machine free from wire connection with the control center and wherein the control mechanism included means comprises a solenoid operated lever and switch structure effective to place the vending machine in vend position and turn the light on and effective upon denergization when the customer actuates the manual means to release the purchased article, the light is turned off and the machine is placed in a non-vend condition.

* * * * *

UNITED STATES PATENT AND TRADEMARK OFFICE

CERTIFICATE OF CORRECTION

PATENT NO. : 4,853,684

DATED : August 1, 1989

INVENTOR(S) : Harold F. Hoppstadter

It is certified that error appears in the above-identified patent and that said Letters Patent is hereby corrected as shown below:

On the cover sheet, in the space above the heading "ABSTRACT", insert: "Attorney, Agent or Firm
- Walter J. Monacelli
Joseph R. Teagno"

Col. 1, line 47, after "machine" insert "which".

Col. 2, line 28, correct "throuth" to read "through".

In Fig. 5, in the lower, right hand portion, insert reference numeral "518" to the lever whose end is designated as "520".

Signed and Sealed this

Tenth Day of July, 1990

Attest:

HARRY F. MANBECK, JR.

*Attesting Officer*

*Commissioner of Patents and Trademarks*